United States Patent
Ohashi et al.

(10) Patent No.: US 10,135,282 B2
(45) Date of Patent: Nov. 20, 2018

(54) STORAGE BATTERY CONTROL APPARATUS, POWER STORAGE SYSTEM, AND METHOD FOR CHARGING STORAGE BATTERY

(71) Applicant: OMRON Corporation, Kyoto-shi, Kyoto (JP)

(72) Inventors: Makoto Ohashi, Uji (JP); Takashi Kitamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/529,258

(22) PCT Filed: Nov. 25, 2015

(86) PCT No.: PCT/JP2015/083118
§ 371 (c)(1),
(2) Date: May 24, 2017

(87) PCT Pub. No.: WO2016/088626
PCT Pub. Date: Jun. 9, 2016

(65) Prior Publication Data
US 2017/0264127 A1    Sep. 14, 2017

(30) Foreign Application Priority Data
Dec. 4, 2014   (JP) ................................. 2014-245923

(51) Int. Cl.
*H02J 7/04*    (2006.01)
*H02J 7/16*    (2006.01)
(Continued)

(52) U.S. Cl.
CPC ................ *H02J 7/022* (2013.01); *H02J 3/32* (2013.01); *H02J 7/0045* (2013.01); *H02J 7/0068* (2013.01); *H02J 7/045* (2013.01)

(58) Field of Classification Search
USPC ........ 320/107, 108, 109, 160, 162, 163, 161
See application file for complete search history.

(56) References Cited

U.S. PATENT DOCUMENTS

2003/0230962 A1    12/2003   Etou
2005/0106432 A1    5/2005   Converse et al.
(Continued)

FOREIGN PATENT DOCUMENTS

JP    2003-229154 A    8/2003
JP    2004-242458 A    8/2004
(Continued)

OTHER PUBLICATIONS

The Japanese Office Action (JPOA) dated Apr. 17, 2018 in a counterpart Japanese patent application.

*Primary Examiner* — Brian Ngo
(74) *Attorney, Agent, or Firm* — Metrolexis Law Group, PLLC

(57) ABSTRACT

A storage battery control apparatus is provided with which a system capable of charging a storage battery using power from an electric power system and also charging the storage battery using power from a power generation system is inexpensively built. A storage battery control apparatus includes a switching control unit and a switch for connecting a CT to a current sensor connecting portion in a power generation system during a period during which a storage battery is charged using power from an electric power system, and for connecting a CT to the current sensor connecting portion during a period during which the storage battery is charged using power from the power generation system.

5 Claims, 11 Drawing Sheets

(51) Int. Cl.
*H02J 7/02* (2016.01)
*H02J 7/00* (2006.01)
*H02J 3/32* (2006.01)

(56) References Cited

U.S. PATENT DOCUMENTS

2014/0354059 A1* 12/2014 Nakamura ................ H02J 3/38
                                                    307/63
2015/0318700 A1   11/2015 Inakagata et al.
2017/0187191 A1*  6/2017 Kojima ..................... H02J 3/38
2017/0264127 A1*  9/2017 Ohashi .................. H02J 7/0045

FOREIGN PATENT DOCUMENTS

| JP | 2004-362778 A | 12/2004 |
| JP | 2007-511891 A | 5/2007 |
| JP | 4552865 B2 | 9/2010 |
| JP | 2013-179836 A | 9/2013 |
| JP | 2014-197955 A | 10/2014 |
| JP | 2014-233145 A | 12/2014 |
| JP | 2015-53842 A | 3/2015 |
| WO | 2014/080599 A1 | 4/2018 |

* cited by examiner

STORAGE BATTERY CONTROL APPARATUS, POWER STORAGE SYSTEM, AND METHOD FOR CHARGING STORAGE BATTERY

TECHNICAL FIELD

The present invention relates to a storage battery control apparatus, a power storage system, and a method for charging a storage battery.

RELATED ART

Power generation systems (fuel battery systems (see Patent Documents 1 to 3), solar power generation systems, gas engine power generation systems etc.) have been developed that are connected, when in use, to a power line (hereinafter referred to as a master power line) for connecting an electric power system (commercial electric power system) to a load. Power storage systems that are connected to a master power line when in use have also been developed.

RELATED ART DOCUMENTS

Patent Documents

Patent Document 1: JP 2004-362778A
Patent Document 2: JP 2003-229154A
Patent Document 3: JP 4552865B
Patent Document 4: JP 2007-511891A

SUMMARY OF THE INVENTION

Problem to be Solved by the Invention

Since power generation systems and power storage systems that can be connected to a master power line have been developed as mentioned above, it is conceivable to build a system capable of generating power and storing power by connecting a power generation system and a power storage system to the same master power line.

Here, considering that there are time periods during which the power purchase rate is more expensive than the power generation cost and time periods during which the power purchase rate is cheaper than the power generation cost, there is a need for a system that combines a power generation system and a power storage system so as to be able to charge a storage battery in the power storage system using power from the electric power system and also to charge the storage battery using power from power generation system. If a control apparatus for integrally controlling the power generation system and the power storage system is provided, a system can be built that is capable of charging the storage battery in the power storage system using power from the electric power system and also charging the storage battery using power from the power generation system. However, if the control apparatus for integrally controlling the power generation system and the power storage system is provided at the time when the power storage system is installed at a later time to a system in which the power generation system has already been provided, the costs of building the system will increase.

An object of the present invention is to provide a storage battery control apparatus and a power storage system with which, even when a storage battery is installed at a later time to a system in which a power generation system has already been provided, a system can be inexpensively built that is capable of charging the storage battery using power from an electric power system and also charging the storage battery using power from the power generation system.

Another object of the present invention is to provide a method for charging a storage battery with which a power supply source to be used to charge a storage battery in a system, in which a power generation system and a power storage system are connected to the same master power line, can be switched in accordance with the situation.

Means for Solving the Problems

To achieve the above-stated objects, a storage battery control apparatus in a first aspect of the present invention is a storage battery control apparatus that is a part of a power supply system that includes a master power line for connecting an electric power system and a load to each other, a power generation system that is connected to a first power line branching from a first branch portion on the master power line and has a function of adjusting, based on a signal from a current detector for detecting reverse power flow, the amount of power generated so that a reverse power flow toward the electric power system does not occur, the storage battery control apparatus connected to a second power line branching from a second branch portion on the master power line, the second branch portion being located on the electric power system side relative to the first branch portion, and a storage battery connected to the storage battery control apparatus, the storage battery control apparatus including: a power conversion unit having a function of converting AC power input via the second power line into DC power and supplying the DC power to the storage battery, and a function of converting DC power from the storage battery into AC power and supplying the AC power via the second power line; a switch for alternatively connecting, to a current detector connecting portion that is provided in the power generation system in order to connect with the current detector for detecting reverse power flow, one of a first current detector attached to a portion on the master power line between the first branch portion and the second branch portion and a second current detector attached to a portion on the master power line, the portion being located on the electric power system side relative to the second branch portion; and a switch control unit for controlling the switch so that the first current detector is connected to the current detector connecting portion during a first period during which the storage battery is charged using power from the electric power system, and for controlling the switch so that the second current detector is connected to the current detector connecting portion during a second period during which the storage battery is charged using power from the power generation system.

That is to say, the first current detector in the power supply system, which is built using the storage battery control apparatus in the first aspect of the present invention, is attached to a portion on the master power line between the first branch portion and the second branch portion. Note that, in the present invention, the current detector refers to one current sensor (usually, CT (Current Transformer)) when the master power line is a single-phase current power line, and refers to two (or three) current sensors when the master power line is a three-phase current power line.

Accordingly, if the switch is controlled so that the first current detector is connected to the current detector connecting portion in the power generation system during the first period during which the storage battery is charged using power from the electric power system, power from the power generation system is not supplied to the second branch portion on the master power line that is located on the electric power system side relative to the first current detector. Since the storage battery is connected to the second branch portion via the storage battery control apparatus and the second power line, the storage battery is charged using power from the electric power system during the first period.

The second current detector (one to three current sensors) is attached to a portion on the master power line that is located on the electric power system side relative to the second branch portion. Accordingly, if the switch is controlled so that the second current detector is connected to the current detector connecting portion in the power generation system during the second period during which the storage battery is charged using power from the power generation system, power from the power generation system may be supplied to the second branch portion on the master power line that is located on the load side relative to the second current detector. Accordingly, if a sufficient amount of power has been obtained from the power generation system during the second period ("power generated by the power generation system−load≥power supplied to the storage battery for charging" holds), the storage battery is charged using only power from the power generation system. If a sufficient amount of power has not been obtained from the power generation system, the storage battery is charged so as to compensate for the insufficiency of power using power from the electric power system.

Thus, with the storage battery control apparatus in the first aspect of the present invention, a power supply system can be built in which the storage battery can be charged using power from the electric power system and can also be charged using power from the power generation system. Also, the storage battery control apparatus in the first aspect of the present invention has a configuration that can be implemented (manufactured) by adding the switch and the switch control unit to a regular storage battery control apparatus. Accordingly, the storage battery control apparatus in the first aspect of the present invention, which can be inexpensively manufactured, can therefore be considered to be an apparatus with which a power supply system having the aforementioned functions can be inexpensively implemented.

To achieve the above-stated objects, a storage battery control apparatus in a second aspect of the present invention is a storage battery control apparatus connected to a storage battery and a master power line for connecting an electric power system and a load to each other, the master power line to which a power generation system is connected via a power line branching from a branch portion for the power generation system, the power generation system having a function of adjusting, based on a signal from a current detector for detecting reverse power flow, the amount of power generated so that a reverse power flow toward the electric power system does not occur, and the current detector for detecting reverse power flow in the power generation system being attached to the master power line at a reverse power flow detection position located on an electric power system side relative to the branch portion for the power generation system, the storage battery control apparatus including; a power conversion unit including an AC terminal portion and having a function of converting AC power input via the AC terminal portion into DC power and supplying the DC power to the storage battery, and a function of converting DC power from the storage battery into AC power and supplying the AC power via the AC terminal portion; a switch connected, via respective power lines, to a first connecting portion on the master power line, the first connecting portion being located on the electric power system side relative to the reverse power flow detection position, and a second connecting portion on the master power line, the second connecting portion being located between the reverse power flow detection position and the branch portion for the power generation system, the switch being for alternatively connecting, to the AC terminal portion in the power conversion unit, one of the power line connected to the first connecting portion and the power line connected to the second connecting portion; and a switch control unit for controlling the switch so that the power line connected to the first connecting portion is connected to the AC terminal portion during a first period during which the storage battery is charged using power from the electric power system, and for controlling the switch so that the power line connected to the second connecting portion is connected to the AC terminal portion during a second period during which the storage battery is charged using power from the power generation system.

That is to say, in the storage battery control apparatus in the second aspect of the present invention, the AC terminal portion in the power conversion unit is configured to be connected to the first connecting portion on the master power line during the first period during which the storage battery is charged using power from the electric power system. The first connecting portion on the master power line is located on the electric power system side relative to the reverse power flow detection position (position at which a current detector for detecting reverse power flow (one or two current sensors for detecting reverse power flow) is attached). For this reason, in a state where the AC terminal portion in the power conversion unit is connected to the first connecting portion, power from the power generation system is not supplied to the power conversion unit for controlling charging and discharging of the storage battery. As a result, the storage battery is charged using power from the electric power system.

In the storage battery control apparatus in the second aspect of the present invention, the AC terminal portion in the power conversion unit is connected to the second connecting portion on the master power line during the second period during which the storage battery is charged using power from the power generation system. The second connecting portion on the master power line is located between the reverse power flow detection position (position at which the current detector for detecting reverse power flow is attached) and the branch portion for the power generation system (portion on the master power line to which the power generation system is connected via a power line). For this reason, when the AC terminal portion in the power conversion unit is connected to the second connecting portion, power from the power generation system may be supplied to the power conversion unit. Accordingly, if a sufficient amount of power has been obtained from the power generation system during the second period, the storage battery is charged using only power from the power generation system. If a sufficient amount of power has not been obtained from the power generation system, the storage battery is charged so as to compensate for the insufficiency of power using power from the electric power system.

Thus, with the storage battery control apparatus in the second aspect of the present invention as well, a power supply system can be built in which the storage battery can be charged using power from the electric power system and can also be charged using power from the power generation system. Also, the storage battery control apparatus in the second aspect of the present invention has a configuration that can be implemented (manufactured) by adding the switch and the switch control unit to a regular storage battery control apparatus. Accordingly, the storage battery control apparatus in the second aspect of the present invention, which can be inexpensively manufactured, can therefore be considered to be an apparatus with which a power supply system having the aforementioned functions can be inexpensively implemented.

The first period and the second period in the storage battery control apparatus in the respective aspects of the present invention may be determined based on the electricity rate, a power usage pattern of a load (one or more devices that use power), the charging rate of the storage battery, or the like. For example, the first period may be set as a time period during which the switch control unit detects that the charging rate of the storage battery is smaller than a predetermined rate, within a preset time period (e.g. a time period during which the electricity rate is cheap), and the second period may be set as a time period during which the switch control unit detects that the charging rate of the storage battery is smaller than a predetermined rate, within a time period excluding the aforementioned time period.

The power storage system according to the present invention includes the above-described storage battery control apparatus according to the present invention, and a storage battery that is controlled by this storage battery control apparatus. Accordingly, with the power storage system according to the present invention as well, a system can be inexpensively built in which the storage battery can be charged using power from the electric power system and can also be charged using power from the power generation system.

A method for charging a storage battery according to an aspect of the present invention is a method for charging a storage battery in a power supply system including a master power line for connecting an electric power system and a load to each other, a power generation system that is connected to a first power line branching from a first branch portion on the master power line and has a function of adjusting, based on a signal from a current detector for detecting reverse power flow, the amount of power generated so that a reverse power flow toward the electric power system does not occur, the storage battery control apparatus connected to the storage battery and a second power line branching from a second branch portion on the master power line, the second branch portion being located on an electric power system side relative to the first branch portion, and a switch for alternatively connecting, to a current detector connecting portion that is provided in the power generation system in order to connect with the current detector for detecting reverse power flow, one of a first current detector attached to a portion on the master power line between the first branch portion and the second branch portion and a second current detector attached to a portion on the master power line, the portion being located on the electric power system side relative to the second branch portion, the method including: a step of controlling the switch so that the first current detector is connected to the current detector connecting portion during a first period during which the storage battery is charged using power from the electric power system; and a step of controlling the switch so that the second current detector is connected to the current detector connecting portion during a second period during which the storage battery is charged using power from the power generation system.

A method for charging a storage battery according to another aspect of the present invention is a method for charging a storage battery in a power supply system including a master power line for connecting an electric power system and a load to each other, a power generation system that is connected to a power line branching from a branch portion for the power generation system on the master power line, and has a function of adjusting, based on a signal from a current detector for detecting reverse power flow, the amount of power generated so that a reverse power flow toward the electric power system does not occur, the current detector for detecting reverse power flow in the power generation system, the current detector for detecting reverse power flow being attached to the master power line at a reverse power flow detection position located on an electric power system side relative to the branch portion for the power generation system, and a switch connected, via respective power lines, to a first connecting portion on the master power line, the first connecting portion being located on the electric power system side relative to the reverse power flow detection position, and a second connecting portion on the master power line, the second connecting portion being located between the reverse power flow detection position and the branch portion for the power generation system, the switch being for alternatively connecting, to an AC input/output portion in the storage battery apparatus, one of a power line connected to the first connecting portion and a power line connected to the second connecting portion, the method including: a step of controlling the switch so that the power line connected to the first connecting portion is connected to the AC terminal portion during a first period during which the storage battery is charged using power from the electric power system; and a step of controlling the switch so that the power line connected to the second connecting portion is connected to the AC terminal portion during a second period during which the storage battery is charged using power from the power generation system.

Accordingly, with each method for charging a storage battery according to the present invention, the power supply source to be used to charge a storage battery in a system, in which a power generation system and an electricity storage system are connected to the same master power line, can be switched in accordance with the situation.

Effects of the Invention

With the storage battery control apparatus and the power storage system according to the present invention, a system can be inexpensively built in which it is possible to charge the storage battery using power from the electric power system and also charge the storage battery using power from the power generation system. With the method for charging a storage battery according to the present invention, the power supply source to be used to charge the storage battery in a system, in which the power generation system and the power storage system are connected to the same master power line, is switched in accordance with the situation.

BRIEF DESCRIPTION OF THE DRAWINGS

FIG. 4A is a diagram illustrating a state that the first power supply system may be in.

FIG. 5A is a diagram illustrating a state that the first power supply system may be in.

FIG. 7A is a diagram illustrating a state that the second power supply system may be in.

FIG. 7B is a diagram illustrating a state that the second power supply system may be in.

EMBODIMENTS OF THE INVENTION

First Embodiment

Figure 1:
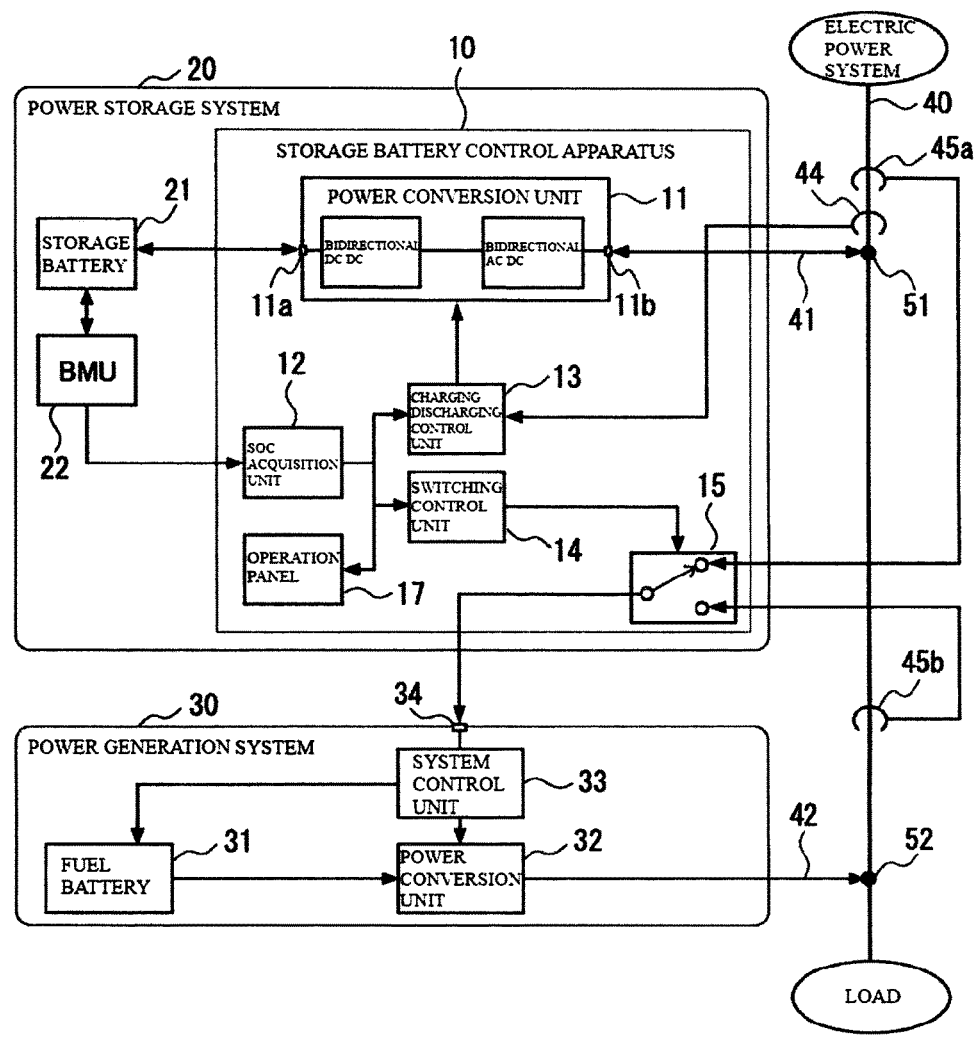
FIG. 1 is a schematic block diagram of a power supply system (first power supply system) that uses a storage battery control apparatus according to a first embodiment.

FIG. 1 shows a configuration of a power supply system that is built using a storage battery control apparatus 10 according to the first embodiment of the present invention.

This power supply system is a system for supplying AC power to a load (one or more devices that use power) without allowing the power to flow in a reverse direction toward the electric power system (commercial electric power system). As shown in the diagram, the power supply system has a configuration in which a power storage system 20 and a power generation system 30 are connected to a master power line 40 for connecting the electric power system and the load to each other. Note that this power supply system is a system for a single-phase current in which the master power line 40 is constituted by two wires (voltage wire and grounding wire).

The power generation system 30 is an existing fuel battery system (that has not been modified/improved to be combined with the storage battery control apparatus 10) in which a fuel battery 31, such as a solid polymer fuel cell, is combined with a power conversion unit 32, a system control unit 33, and so forth.

The power conversion unit 32 is a unit (circuit) for converting DC power from the fuel battery 31 into AC power. As shown in the diagram, the power conversion unit 32 in the power generation system 30 is connected to the master power line 40 via a power line 42, which branches from a branch portion 52 on the master power line 40.

The system control unit 33 is a unit for controlling the fuel battery 31 and the power conversion unit 32 so that an appropriate amount of power is output from the fuel battery system 30 (power conversion unit 32). Note that, in practice, the system control unit 33 does not control the fuel battery 31 itself but controls a system (not shown) for supplying fuel and air to the fuel battery 31.

The system control unit 33 has a reverse power flow prevention function. Here, the reverse power flow prevention function refers to a function of limiting the output of the fuel battery system 30 so that reverse power flow (power flow toward the electric power system side) does not occur, based on a signal from a reverse power flow detection CT (Current Transformer), which is attached to the master power line 40.

The power generation system 30 is provided with a current sensor connecting portion 34 for connection with the reverse power flow detection CT. However, the CT is not directly connected to the current sensor connecting portion 34 in the power generation system 30 that is used as a constituent element of this power supply system, but either one of two CTs 45a and 45b is connected thereto via a switch 15 in the storage battery control apparatus 10 (details will be described later).

The power storage system 20 is a system in which a storage battery 21 and a BMU (Battery Management Unit) 22 are connected to the storage battery control apparatus 10 according to this embodiment.

The storage battery 21 is a relatively large-capacity storage battery that includes a plurality of battery cells (e.g. lithium-ion battery cells). The BMU 22 is a unit for monitoring and controlling the state of each battery cell in the storage battery 21 having such a configuration. The BMU 22 has the function of outputting an SOC (State of Charge; hereinafter also referred to as a charging level).

The storage battery control apparatus 10 is an apparatus that includes a power conversion unit 11, an SOC acquisition unit 12, a charging/discharging control unit 13, a switching control unit 14, the switch 15, and an operation panel 17.

The SOC acquisition unit 12 is a unit for periodically acquiring the SOC from the BMU 22 and notifying the charging/discharging control unit 13 and the switching control unit 14 of the acquired SOC.

The power conversion unit 11 is a unit that has a bidirectional AC/DC converter and a bidirectional DC/DC converter as main constituent elements, and performs power conversion between AC power and DC power. This power conversion unit 11 has a DC terminal portion 11a to/from which DC power is input and output, and an AC terminal portion 11b to/from which AC power is input and output. The DC terminal portion 11a in the power conversion unit 11 is connected to the storage battery 21. The AC terminal portion 11b in the power conversion unit 11 is connected to the master power line 40 via a power line 41, which branches from a branch portion 51 located on the electric power system side relative to the branch portion 52.

The operation panel 17 is a unit constituted by an LCD (Liquid Crystal Display), a plurality of push button switches, and the like. In the storage battery control apparatus 10 according to this embodiment, a charging level at which charging of the storage battery 21 starts (hereinafter referred to as a charging start level), a charging level at which the charging of the storage battery 21 ends (hereinafter referred to as a charging stop level), an electric power system priority period, and the like are set using the aforementioned operation panel 17. Note that the electric power system priority period refers to a time period that is referenced when the switch 15 is controlled (details will be described later). Usually, a time period during which the power purchase rate is cheaper than the power generation cost is set as the electric power system priority period.

The charging/discharging control unit 13 is a unit for controlling the power conversion unit 11 based on the SOC (charging level) of which the charging/discharging control unit 13 is notified from the SOC acquisition unit 12, and a signal from a CT 44, which is attached to a portion on the master power line 40 that is located on the electric power system side relative to the branch portion 51. The content of control performed by this charging/discharging control unit 13 is similar to the content of control performed by a control unit provided in an existing storage battery control apparatus (power conditioner for storage battery). For this reason, although a detailed description thereof will be omitted, the charging/discharging control unit 13 determines whether or not the storage battery 21 needs to be charged, and whether or not the storage battery 21 needs to be discharged, based on the SOC and a signal from the CT 44.

Based on the determination result, the charging/discharging control unit 13 performs processing to control the power conversion unit 11 so as to convert AC power from the master power line 40 into DC power and supply the DC power to the storage battery 21, and processing to control the power conversion unit 11 so as to convert DC power from the storage battery 21 into AC power and output the AC power. The charging/discharging control unit 13 also performs processing to control the power conversion unit 11 so as to increase/reduce the amount of output power, and processing to control the power conversion unit 11 so as to disconnect the storage battery 21 and the master power line 40 from each other (so that the power is not exchanged between the storage battery 21 and the master power line 40).

Note that, regarding the determination of whether or not the storage battery 21 needs to be charged that is made by the charging/discharging control unit 13, basically, it is determined that the storage battery 21 needs to be charged if the SOC≤the charging start level holds, and it is determined that the storage battery 21 does not need to be charged if the SOC≥the charging stop level (>charging start level) holds.

The switching control unit 14 and the switch 15 are units provided in the storage battery control apparatus 10 to enable charging of the storage battery 21 using power from the electric power system even when there is surplus power in the power generation system 30.

Specifically, the switch 15 is a two-input, one-output switch (selector) capable of controlling the state thereof (output which input), based on a control signal from the switching control unit 14. An output terminal of this switch 15 is connected to the current sensor connecting portion 34 in the power generation system 30 (system control unit 33) via a signal line. A signal line from the CT 45a, which is attached to a portion on the master power line 40 that is located on the electric power system side relative to the branch portion 51 and the position at which the CT 44 is attached, is connected to a first input terminal (upper input terminal in FIG. 1) of the switch 15. A signal line from the CT 45b, which is attached to a portion on the master power line 40 that is located between the branch portion 51 and the branch portion 52, is connected to a second input terminal of the switch 15.

The switching control unit 14 is a unit for controlling the switch 15 so as to enable charging of the storage battery 21 using power from the electric power system even in the case where there is surplus power in the power generation system 30 (details will be described later).

Figure 2:
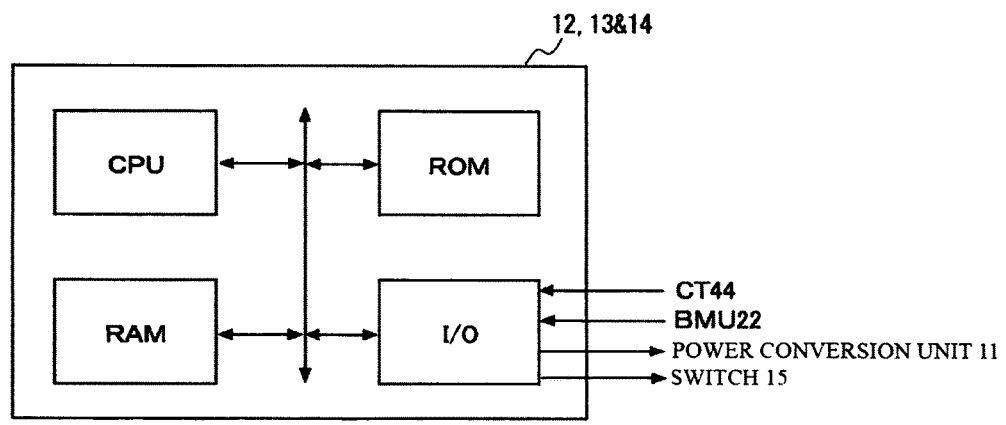
FIG. 2 is a diagram illustrating an example of implementing an SOC acquisition unit, a charging/discharging control unit, and a switching control unit in the storage battery control apparatus according to the first embodiment.

The SOC acquisition unit 12, the charging/discharging control unit 13, and the switching control unit 14 are implemented as a unit having a configuration shown in FIG. 2, for example. That is to say, the SOC acquisition unit 12, the charging/discharging control unit 13, and the switching control unit 14 are implemented as a unit that includes, for example, a CPU, a ROM in which a program (firmware) or the like to be executed by the CPU is stored, a RAM that is used as a work area, and an I/O (Input and Output) that functions as an interface circuit for each unit and the SOC acquisition unit 12. However, the SOC acquisition unit 12, the charging/discharging control unit 13, and the switching control unit 14 do not need to be implemented as a unit including one CPU. Accordingly, a unit that includes a CPU to function as the switching control unit 14 and a unit that includes a CPU to function as the charging/discharging control unit 13 may be separately provided.

The content of control performed by the switching control unit 14 for the switch 15 will be described below.

Figure 3:
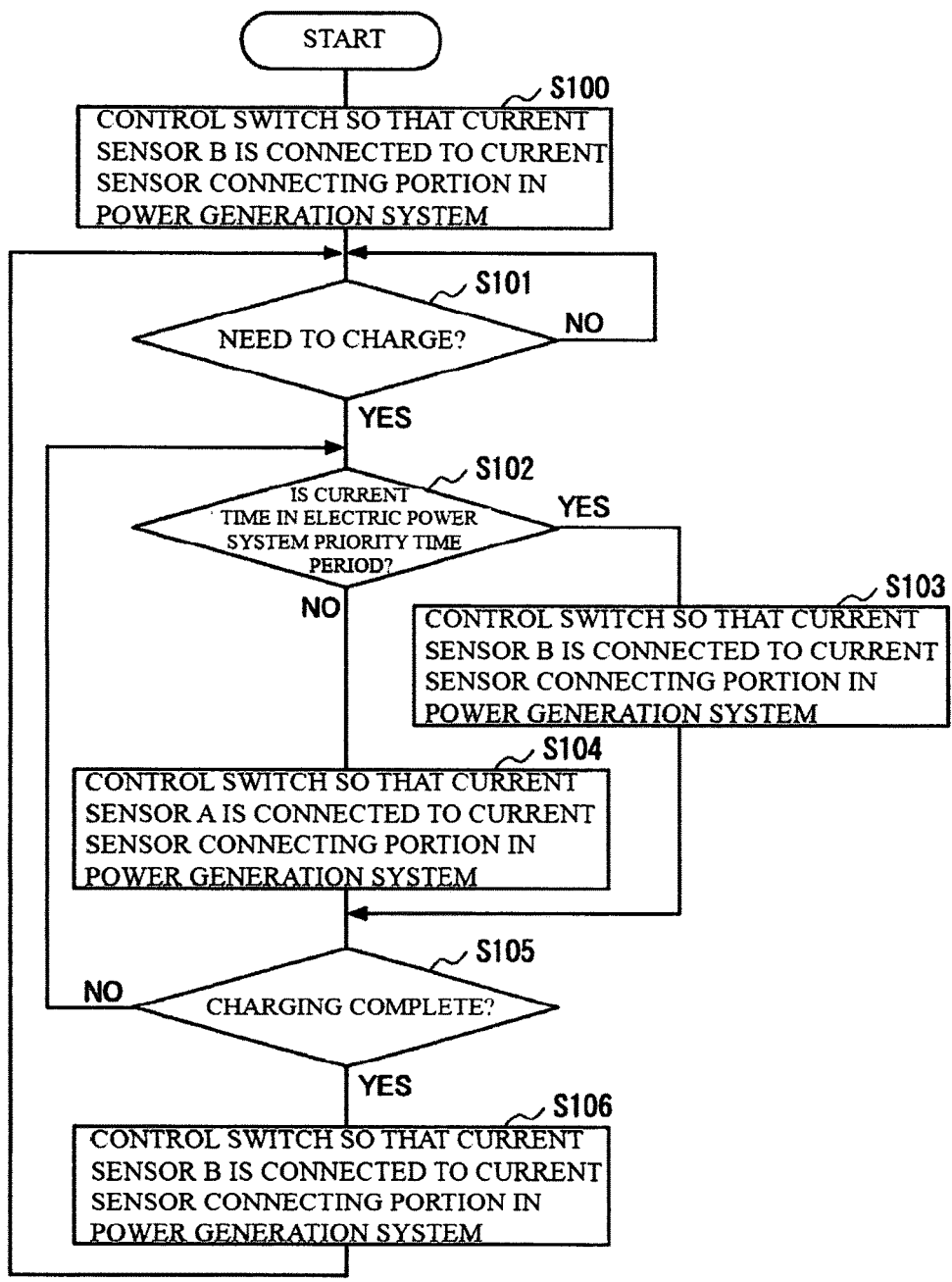
FIG. 3 is a flowchart of switch control processing executed by the switching control unit in the storage battery control apparatus according to the first embodiment.

FIG. 3 is a flowchart of switch control processing executed by the switching control unit 14. Note that, in this flowchart and the following description, a current sensor A refers to the CT 45a, and a current sensor B refers to the CT 45b.

When a power switch of the storage battery control apparatus 10 turns on, the switching control unit 14 starts this switch control processing, and initially controls the switch 15 so that the current sensor B (CT 45b) is connected to the current sensor connecting portion 34 in the power generation system 30 (step S100). Note that, if the second input terminal (input terminal to which the CT 45b is connected) is in a state of being connected to the output terminal when the switch 15 is not specifically controlled, this processing in step S100 can be omitted.

The switching control unit 14 that has ended the processing in step S100 enters a state of monitoring whether the storage battery 21 needs to be charged (a state of repeating the determination in step S101). The determination made in step S101 by the switching control unit 14 is the same as the determination of whether or not the storage battery 21 needs to be charged that is made by the charging/discharging control unit 13.

If the storage battery 21 needs to be charged (step S101; YES), the switching control unit 14 determines whether or not the current time is a time within the set electric power system priority period (step S102).

If the current time is a time within the electric power system priority period (step S102; YES), the switching control unit 14 controls the switch 15 so that the current sensor B (CT 45b) is connected to the current sensor connecting portion 34 in the power generation system 30 (step S103). If the current time is not a time within the electric power system priority period (step S102; NO), the switching control unit 14 controls the switch 15 so that the current sensor A (CT 45a) is connected to the current sensor connecting portion 34 in the power generation system 30 (step S104). Note that, if the current sensor B has already been connected to the current sensor connecting portion 34, the state of the switch 15 is not changed by the processing in step S103. Similarly, if the current sensor A has already been connected to the current sensor connecting portion 34, the state of the switch 15 is not changed by the processing in step S104.

The switching control unit 14, after finishing the processing in step S103 or S104, determines whether or not the charging of the storage battery 21 is complete based on the SOC of which the switching control unit 14 is notified from the SOC acquisition unit 12 (step S105). If the charging of the storage battery 21 is not complete (step S105; NO), the switching control unit 14 returns to step S102, and again determines whether or not the current time is a time within the electric power system priority period.

If the charging of the storage battery 21 has completed while the above processing is repeated (step S105; YES), the switching control unit 14 controls the switch 15 so that the current sensor B is connected to the current sensor connecting portion 34 in the power generation system 30 (step S106). If the current sensor B has already been connected to the current sensor connecting portion 34, the state of the switch 15 is not changed by the processing in step S106, similar to the processing in step S104.

The switching control unit 14 that has finished the processing in step S106 returns to step S101, and waits for the storage battery 21 to require charging again.

The content of switch control processing (FIG. 3) will be described below in more detail.

As is clear from the above-described processing procedure, in the switch control processing, the current sensor A (CT 45a) is connected to the current sensor connecting portion 34 only during a time period during which the storage battery 21 needs to be charged, excluding the electric power system priority period, and the current sensor B (CT 45b) is connected to the current sensor connecting portion 34 during the other time period.

Figure 4A:
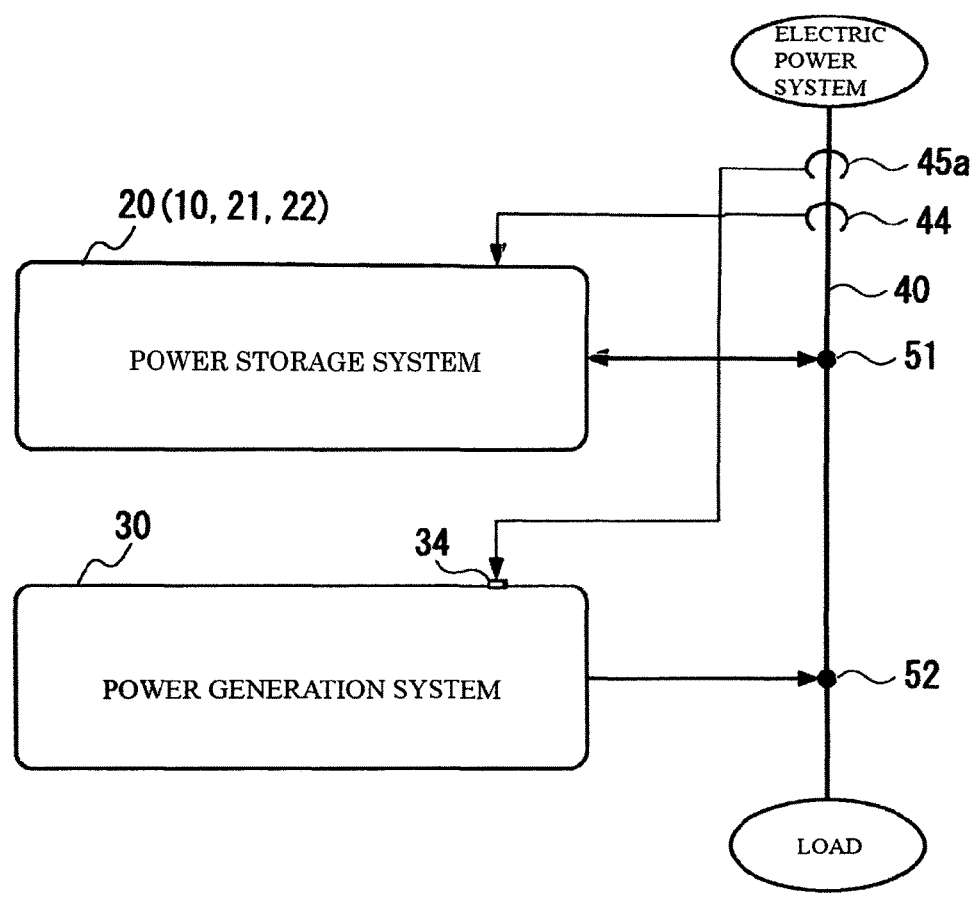
Figure 4B:
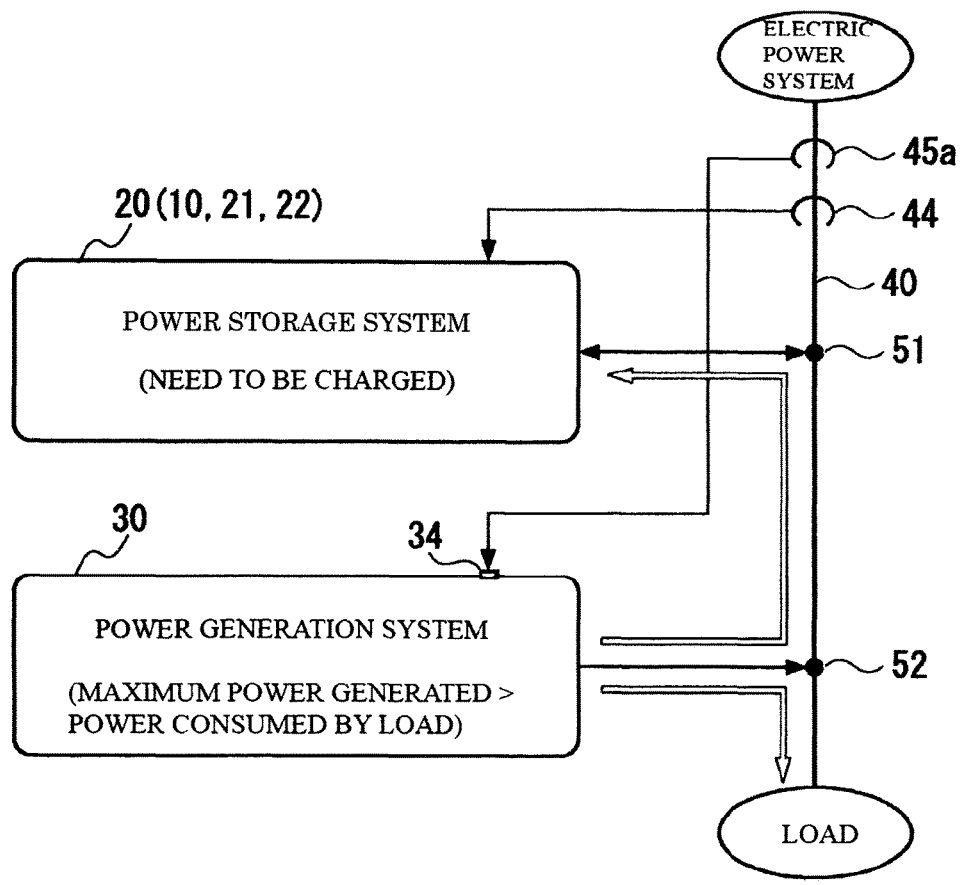
FIG. 4B is a diagram for illustrating a power flow at the time of charging in the state shown in FIG. 4A.

Upon the current sensor A (CT 45a) being connected to the current sensor connecting portion 34 via the switch 15, the state shown in FIG. 4A is attained. In this state, the power output from the power generation system 30 is controlled (adjusted) so that a reverse power flow does not occur at the position at which the current sensor A (CT 45a) is attached. Upon the charging of the storage battery 21 being started, the storage battery 21 functions as a load (device that uses power). Accordingly, if the charging of the storage battery 21 is started with the current sensor A (CT 45a) connected to the current sensor connecting portion 34 and outputting power that is greater than the maximum power generated by the power generation system 30, the output power from the power generation system 30 increases, and the storage battery 21 is charged using power from the power generation system 30, as is schematically illustrated in FIG. 4B. Note that, in the charging in this case, power from the electric power system is also used when necessary.

Figure 5A:
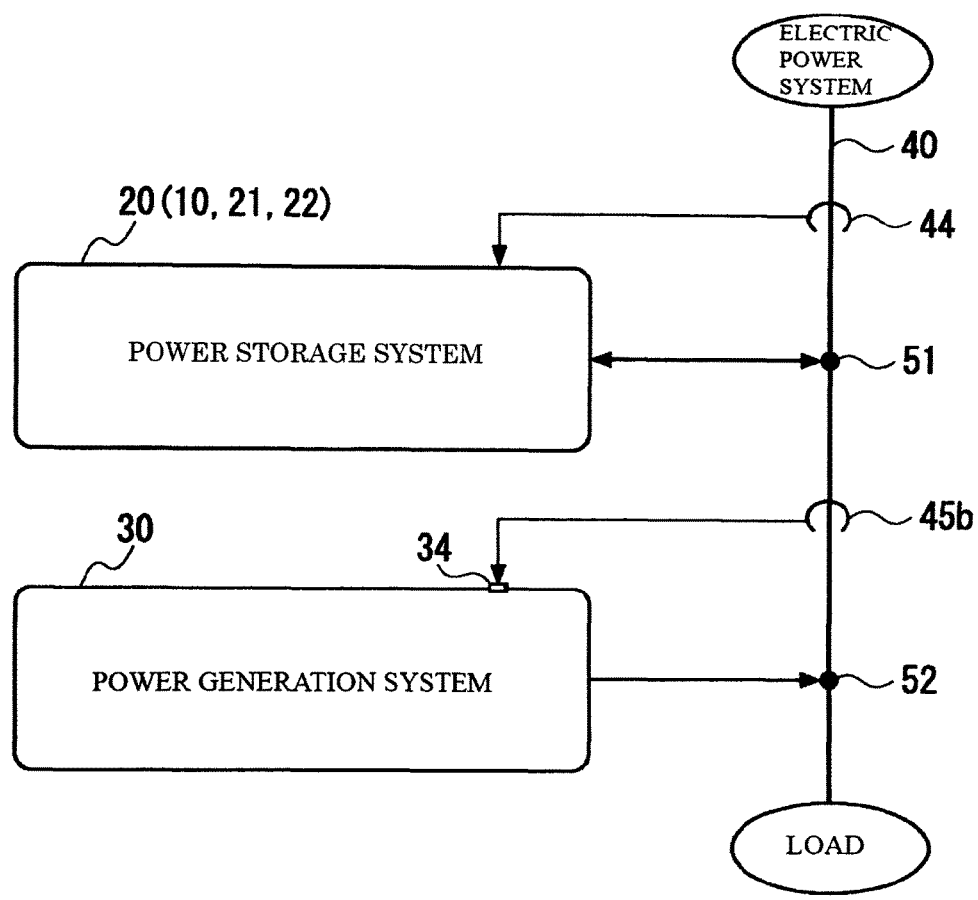
Figure 5B:
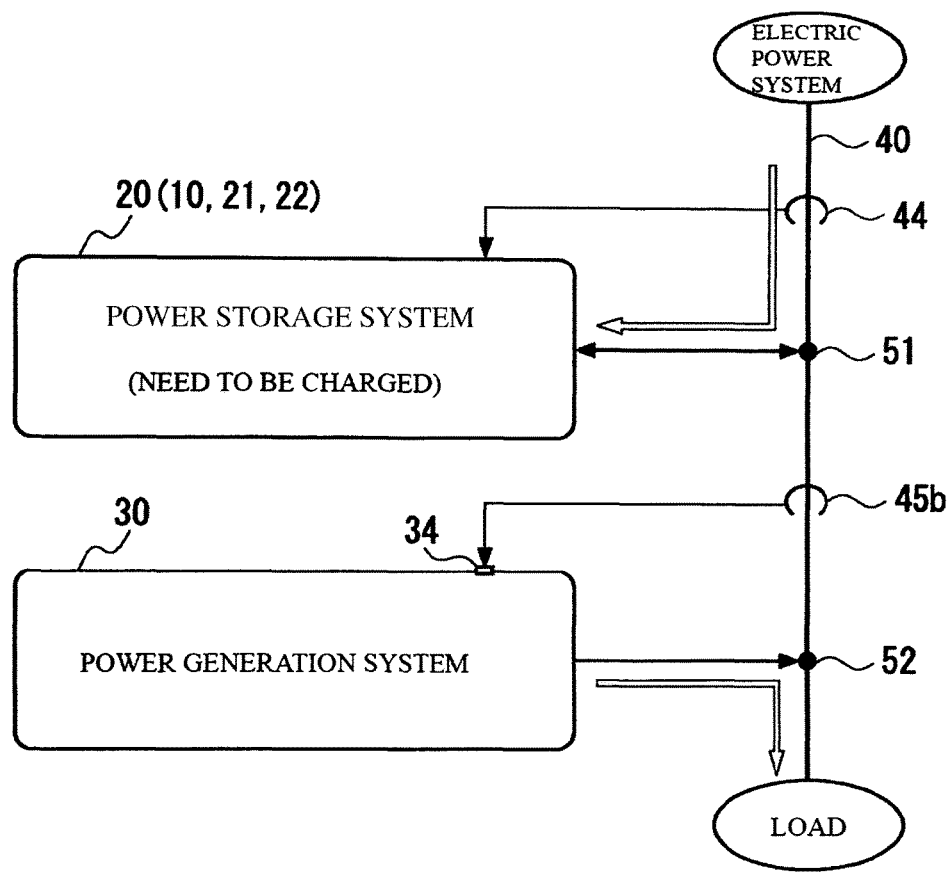
FIG. 5B is a diagram for illustrating a power flow at the time of charging in the state shown in FIG. 5A.

On the other hand, upon the current sensor B (CT 45b) being connected to the current sensor connecting portion 34 via the switch 15, the state shown in FIG. 5A is attained. In this state, the output power from the power generation system 30 is controlled so that a reverse power flow does not occur at the position at which the current sensor B (CT 45b) is attached. Accordingly, even if the charging of the storage battery 21 is started, the power is not supplied from the power generation system 30 to the power storage system 20. As a result, the storage battery 21 is charged using power from the electric power system, as is schematically illustrated in FIG. 5B.

As described above, the power supply system, in which the storage battery control apparatus 10 according to this embodiment is combined with the power generation system 30 or the like, can charge the storage battery 21 using power from the electric power system and also charge the storage battery 21 using power from the power generation system 30. The storage battery control apparatus 10 according to this embodiment can be manufactured by only adding the switch 15 and the function of controlling the switch 15 (switching control unit 14) to an existing storage battery control apparatus. Accordingly, with the storage battery control apparatus 10 according to this embodiment, it is possible to more inexpensively implement a power supply system in which charging can be performed using power from the electric power system, and can also be performed using power from power generation system 30, than in the case of providing a control apparatus for integrally controlling the power generation system and the power storage system. Also, with the storage battery control apparatus 10 according to this embodiment, it is also possible to implement a power supply system capable of storing power and having the above-described functions, using an existing power generation system 30 as-is.

Second Embodiment

Figure 6:
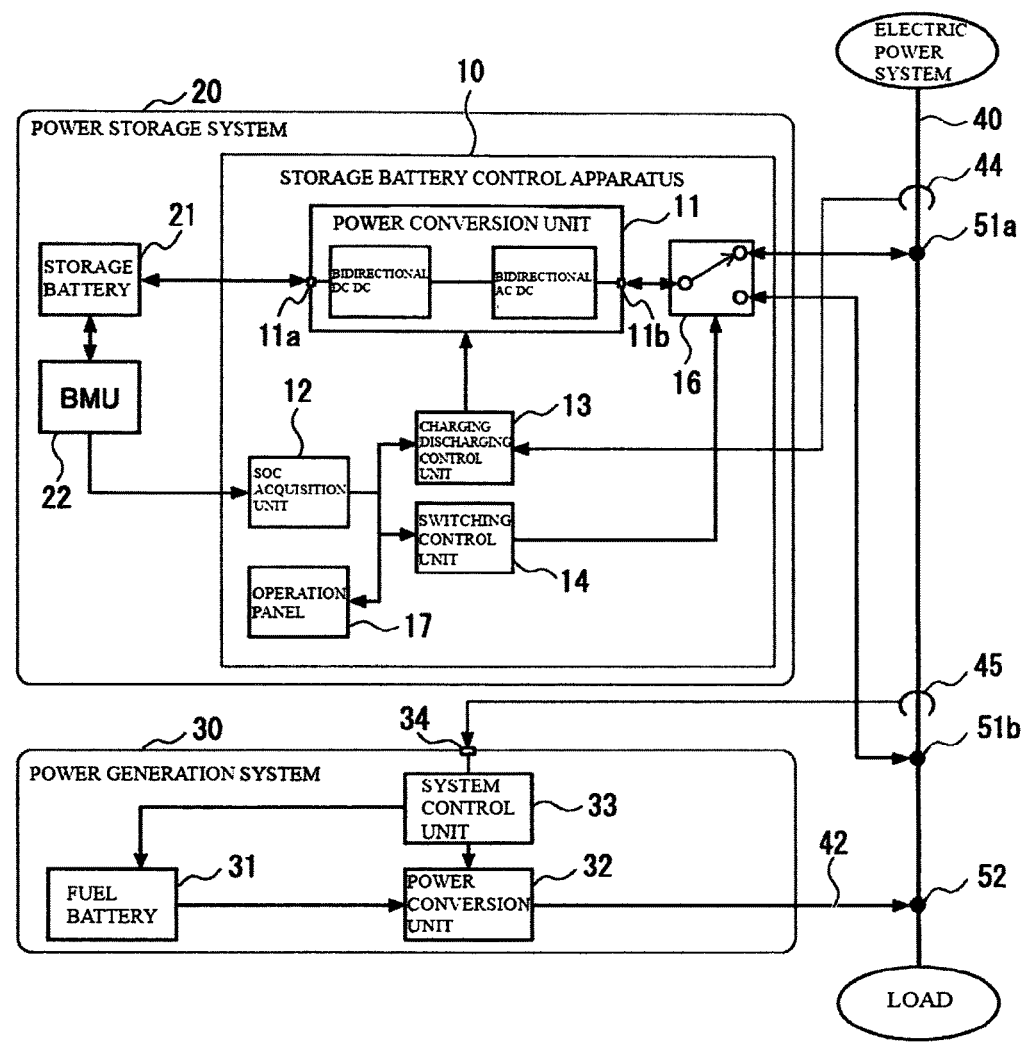
FIG. 6 is a schematic block diagram of a power supply system (second power supply system) that uses a storage battery control apparatus according to a second embodiment.

FIG. 6 shows a configuration of a power supply system that is built using the storage battery control apparatus 10 according to the second embodiment of the present invention.

A description will be given below, using FIG. 6, of a configuration and operation of the storage battery control apparatus 10 according to this embodiment, focusing mainly on the differences from the storage battery control apparatus 10 according to the first embodiment. Note that, in the following description, a power supply system using the storage battery control apparatus 10 according to the first embodiment (FIG. 1) will be referred to as a first power supply system, and a power supply system using the storage battery control apparatus 10 according to this embodiment (FIG. 6) will be referred to as a second power supply system, for convenience of description.

The power generation system 30 in the second power supply system is the same as the power generation system 30 in the first power supply system. However, as shown in the diagram, a reverse power flow detection CT 45, which is attached to a position on the master power line 40 that is located on the electric power system side relative to the branch portion 52 (a portion at which the power line 42 branches toward the power generation system 30), is directly connected to the current sensor connecting portion 34 in the power generation system 30 in the second power supply system.

The storage battery control apparatus 10 according to the second embodiment substantially is an apparatus in which the switch 15 in the storage battery control apparatus 10 according to the first embodiment is replaced with a switch 16.

Similar to the switch 15, the switch 16 is a two-input, one-output switch (selector) that is capable of controlling the state thereof (which input to output), based on a control signal from the switching control unit 14. However, the switch 16 is not a circuit for switching between CTs to be connected to the current sensor connecting portion 34, but is a circuit for switching between portions at which the AC terminal portion 11b in the power conversion unit 11 is connected to the master power line 40.

Specifically, as shown in the diagram, the output terminal of the switch 16 is connected to the AC terminal portion 11b in the power conversion unit 11. A first input terminal of the switch 16 (upper input terminal in FIG. 6) is connected to a branch portion 51a, which is located on the electric power system side relative to the position at which the CT 45 is attached. A second input terminal of the switch 16 is connected to a branch portion 51b, which is located between the branch portion 52 and the position at which the CT 45 is attached.

Figure 7A:
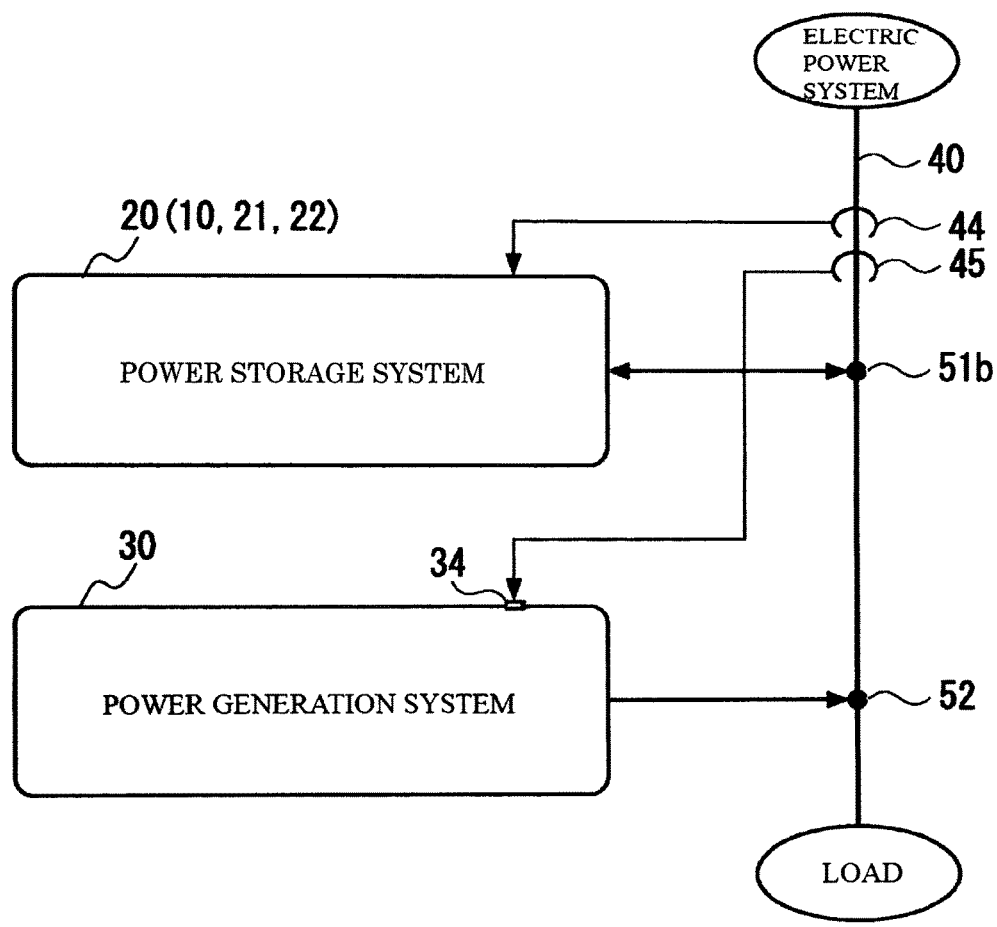
Figure 7B:
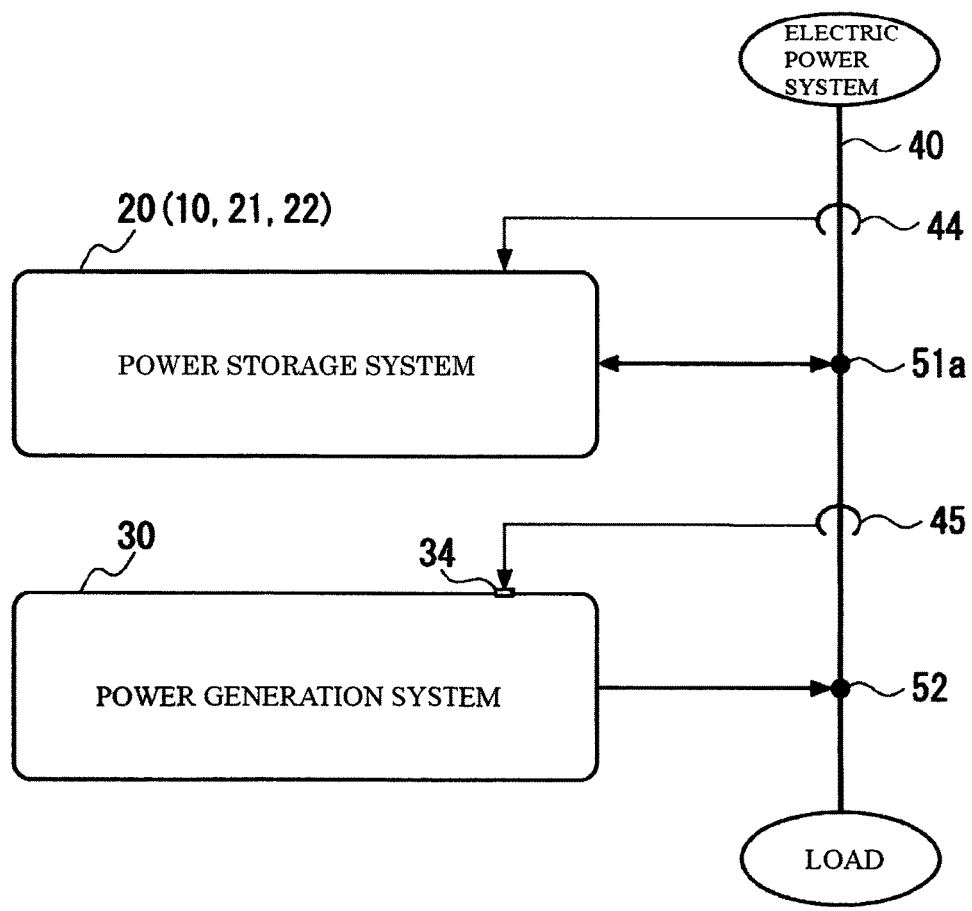

In short, the second power supply system that is built using the storage battery control apparatus 10 according to the second embodiment may be in a state shown in FIG. 7A and a state shown in FIG. 7B, as a result of controlling the switch 16.

Figure 8:
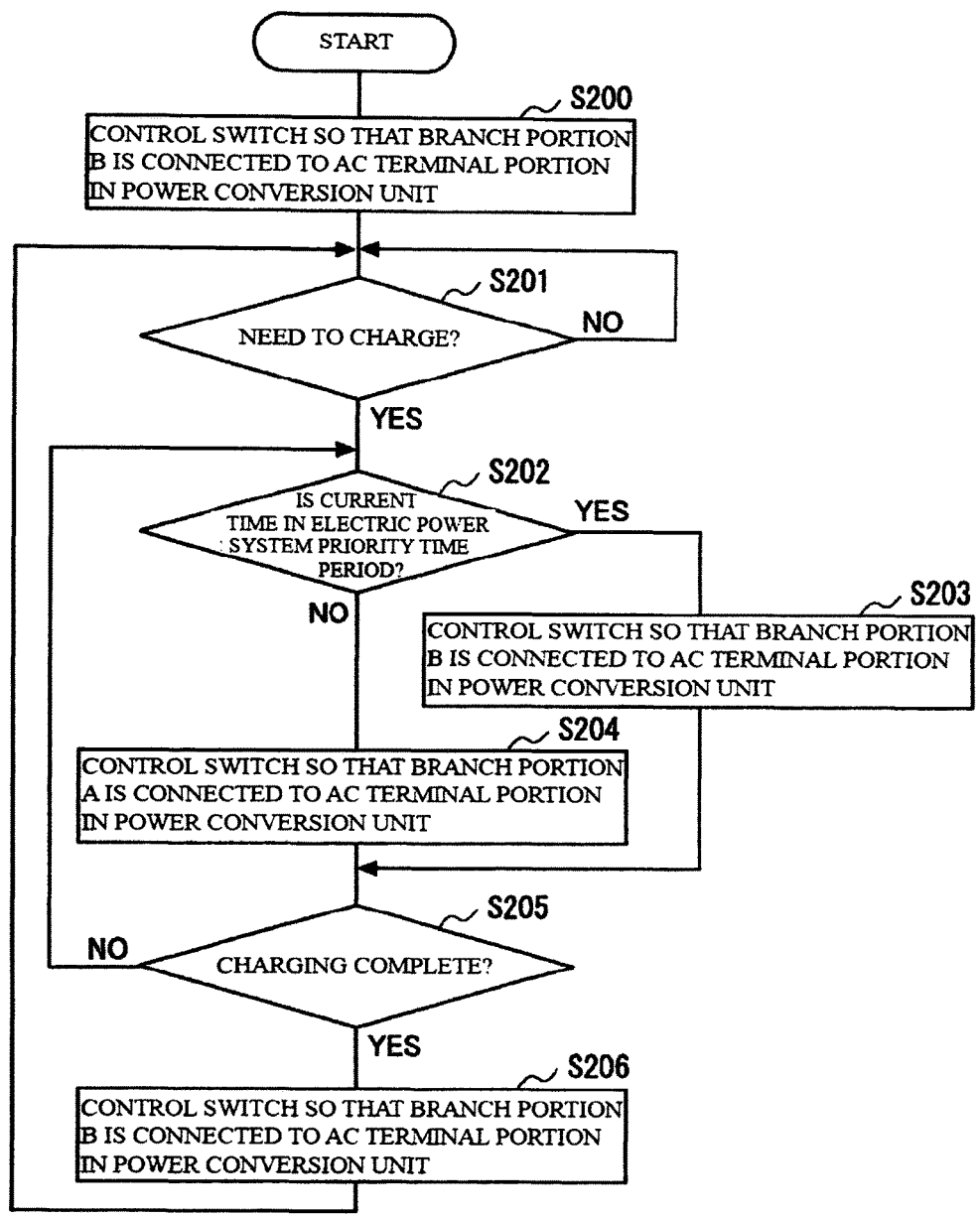
FIG. 8 is a flowchart of switch control processing executed by the switching control unit in the storage battery control apparatus according to the second embodiment.

The state shown in FIG. 7A is the same as the state shown in FIG. 5A, and the state shown in FIG. 7B is the same as the state shown in FIG. 5B. The switching control unit 14 in the storage battery control apparatus 10 according to the second embodiment is configured (programmed) to start switch control processing, the procedure of which is shown in FIG. 8, upon the power switch of the storage battery control apparatus 10 turning on.

Processing in steps S201, S202, and S205 in this switch control processing (FIG. 8) is the same as processing in steps S101, S102, and S105, respectively, in the switch control processing (FIG. 3) performed by the switching control unit 14 in the storage battery control apparatus 10 according to the first embodiment. Processing in the other steps is substantially the same as processing in the corresponding steps in the switch control processing (FIG. 3) (processing that is different only in that the switch 16, instead of the switch 15, is to be controlled, and that the control is performed through the power, rather than through the signal). For this reason, although a detailed description of this switch control processing will be omitted, a branch portion A and a branch portion B in FIG. 8 refer to the branch portion 51a and the branch portion 51b, respectively.

As is clear from the above description, the power supply system (FIG. 6), in which the storage battery control apparatus 10 according to this embodiment is combined with the power generation system 30 or the like, can also charge the storage battery 21 using power from the electric power system and also charge the storage battery 21 using power from the power generation system 30. The storage battery control apparatus 10 according to this embodiment is also an apparatus that can be manufactured by slightly modifying an existing storage battery control apparatus. Accordingly, with the storage battery control apparatus 10 according to this embodiment as well, it is possible to inexpensively implement a power supply system in which charging can be performed using power from the electric power system, and can also be performed using power from the power generation system 30, as in the case of using the storage battery control apparatus 10 according to the first embodiment.

Modifications

The storage battery control apparatus 10 according to each of the above-described embodiments can be modified in various manners. For example, although the storage battery control apparatus 10 is an apparatus for a single-phase current, the storage battery control apparatus 10 can be modified into an apparatus for a three-phase current that is used in combination with a power generation system 30 for three-phase current. Note that two CTs are required for measuring a current that flows through master power lines for three-phase current. Accordingly, when the storage battery control apparatus 10 according to the first embodiment is modified into an apparatus for three-phase current, the power conversion unit 11 and the like may be replaced with those for three-phase current, and the switch 15 may be replaced with one capable of simultaneously switching between a CT for a phase R and a CT for a phase S. Of course, to more accurately detect the presence of a reverse power flow, the switch 15 may be replaced with one capable of simultaneously switching among three CTs (phase-R CT, phase-S CT, phase-T CT).

The content of the switch control processing (FIGS. 3 and 8) may not be identical to the above-described content. For example, processing in step S106 in the switch control processing in FIG. 3 may be processing in which the switch 15 is controlled so that the current sensor A (CT 45a) is connected to the current sensor connecting portion 34. Similarly, processing in step S206 in the switch control processing in FIG. 8 may be processing in which the switch 16 is controlled so that the branch portion A (branch portion 51a) is connected to the AC terminal portion 11a. Furthermore, processing in steps S106 and S206 may be processing to determine the content of control for the switch (15, 16) and control the switch based on the current time or the like.

In the processing in steps S101 and S201 in the above-described switch control processing, the SOC is compared with the charging start/stop level. However, switch control processing may be modified into processing in which the result of the determination of whether or not the storage battery 21 needs to be charged is acquired from the charging/discharging control unit 13, and the processing branches in step S101/S201 in accordance with this determination result.

Furthermore, based on the above-described technique, an independent switching apparatus having a function that corresponds to a portion constituted by the switching control unit 14 and the switch 15 or 16 may be implemented (manufactured). Note that, in the case of implementing such a switching apparatus, either a configuration in which the SOC is acquired from the storage battery control apparatus to make the determination in step S101 or S201, or a configuration in which information (signal) that indicates whether or not the storage battery needs to be charged is acquired from the storage battery control apparatus to make the determination in step S101 or S201, may be employed.

If the power generation system 30 to be combined with the storage battery control apparatus 10 according to each embodiment is a system having a reverse power flow prevention function, of course, this system may also be any power generation system other than a fuel battery system (gas engine power generation system, solar power generation system etc.).

INDEX TO THE REFERENCE NUMERALS

10 Storage battery control apparatus
11 Power conversion unit
11a DC terminal portion
11b AC terminal portion
12 SOC acquisition unit
13 Charging/discharging control unit
14 Switching control unit
15, 16 Switch
17 Operation panel
20 Power storage system
21 Storage battery
22 BMU
30 Power generation system
31 Fuel battery
32 Power conversion unit
33 System control unit
34 Current sensor connecting portion
40 Master power line
41, 42 Power line
44, 45, 45a, 45b CT
51, 51a, 51b, 52, 52b Branch portion

The invention claimed is:

1. A storage battery control apparatus in a power supply system that includes a master power line for connecting an electric power system and a load to each other, a power generation system that is connected to a first power line branching from a first branch portion on the master power line and is capable of adjusting, based on a signal from a current detector for detecting reverse power flow, an amount of power generated so that a reverse power flow toward an electric power system does not occur, the storage battery control apparatus connected to a second power line branching from a second branch portion on the master power line, the second branch portion being located on an electric power system side relative to the first branch portion, and a storage battery connected to the storage battery control apparatus, the storage battery control apparatus comprising:

a power conversion circuit that converts AC power input via the second power line into DC power and supplies the DC power to the storage battery, and converts DC power from the storage battery into AC power and supplies the AC power via the second power line;

a switch that alternatively connects, to a current detector connecting portion that is provided in the power generation system in order to connect with the current detector for detecting reverse power flow, one of a first current detector attached to a portion on the master power line between the first branch portion and the second branch portion and a second current detector attached to a portion on the master power line, the portion being located on an electric power system side relative to the second branch portion; and a switch control unit comprising a processor configured with a program to perform operations for controlling the switch so that the first current detector is connected to the current detector connecting portion during a first period during which the storage battery is charged using power from the electric power system, and for controlling the switch so that the second current detector is connected to the current detector connecting portion during a second period during which the storage battery is charged using power from the power generation system.

2. The storage battery control apparatus according to claim 1, wherein the first period is a time period during which the processor of the switch control unit is configured with the program to perform operations further comprising detecting that a charging rate of the storage battery is smaller than a predetermined rate, within a preset time period.

3. A storage battery control apparatus connected to a storage battery and a master power line for connecting an electric power system and a load to each other, the master power line to which a power generation system is connected via a power line branching from a branch portion for the power generation system, the power generation system capable of adjusting, based on a signal from a current detector for detecting reverse power flow, an amount of power generated so that a reverse power flow toward the electric power system does not occur, and the current detector for detecting reverse power flow in the power generation system being attached to the master power line at a reverse power flow detection position located on an electric power system side relative to the branch portion for the power generation system, the storage battery control apparatus comprising:

a power conversion circuit including an AC terminal portion, the power conversion circuit converting AC power input via the AC terminal portion into DC power and supplying the DC power to the storage battery, and converting DC power from the storage battery into AC power and supplying the AC power via the AC terminal portion;

a switch connected, via respective power lines, to a first connecting portion on the master power line, the first connecting portion being located on an electric power system side relative to the reverse power flow detection position, and a second connecting portion on the master power line, the second connecting portion being located between the reverse power flow detection position and the branch portion for the power generation system, the switch alternatively connecting, to the AC terminal portion in the power conversion circuit, one of the power line connected to the first connecting portion and the power line connected to the second connecting portion; and a switch control unit comprising a processor configured with a program to perform operations for controlling the switch so that the power line connected to the first connecting portion is connected to the AC terminal portion during a first period during which the storage battery is charged using power from the electric power system, and for controlling the switch so that the power line connected to the second connecting portion is connected to the AC terminal portion during a second period during which the storage battery is charged using power from the power generation system.

4. A method for charging a storage battery in a power supply system including a master power line for connecting an electric power system and a load to each other, a power generation system that is connected to a first power line branching from a first branch portion on the master power line and is capable of adjusting, based on a signal from a current detector for detecting reverse power flow, an amount of power generated so that a reverse power flow toward the electric power system does not occur, a storage battery control apparatus connected to the storage battery and a second power line branching from a second branch portion on the master power line, the second branch portion being located on an electric power system side relative to the first branch portion, and a switch for alternatively connecting, to a current detector connecting portion that is provided in the power generation system in order to connect with the current detector for detecting reverse power flow, one of a first current detector attached to a portion on the master power line between the first branch portion and the second branch portion and a second current detector attached to a portion on the master power line, the portion being located on an electric power system side relative to the second branch portion, the method comprising:

controlling the switch so that the first current detector is connected to the current detector connecting portion during a first period during which the storage battery is charged using power from the electric power system; and controlling the switch so that the second current detector is connected to the current detector connecting portion during a second period during which the storage battery is charged using power from the power generation system.

5. A method for charging a storage battery in a power supply system including a master power line for connecting an electric power system and a load to each other, a power generation system that is connected to a power line branching from a branch portion for the power generation system on the master power line, and is capable of adjusting, based on a signal from a current detector for detecting reverse power flow, an amount of power generated so that a reverse power flow toward the electric power system does not occur, the current detector for detecting reverse power flow in the power generation system, the current detector for detecting reverse power flow being attached to the master power line at a reverse power flow detection position located on an electric power system side relative to the branch portion for the power generation system, and a switch connected, via respective power lines, to a first connecting portion on the master power line, the first connecting portion being located on an electric power system side relative to the reverse power flow detection position, and a second connecting portion on the master power line, the second connecting portion being located between the reverse power flow detection position and the branch portion for the power generation system, the switch being for alternatively connecting, to an AC input/output portion in the storage battery, one of a power line connected to the first connecting portion and a power line connected to the second connecting portion, the method comprising:
    controlling the switch so that the power line connected to the first connecting portion is connected to an AC terminal portion during a first period during which the storage battery is charged using power from the electric power system; and
    controlling the switch so that the power line connected to the second connecting portion is connected to the AC terminal portion during a second period during which the storage battery is charged using power from the power generation system.

\* \* \* \* \*